(12) United States Patent
Huang et al.

(10) Patent No.: US 11,997,625 B2
(45) Date of Patent: May 28, 2024

(54) METHOD AND APPARATUS FOR SYNCHRONIZATION IN SIDELINK COMMUNICATIONS

(71) Applicant: ZTE CORPORATION, Guangdong (CN)

(72) Inventors: Shuanghong Huang, Guangdong (CN); Youxiong Lu, Guangdong (CN); Weimin Xing, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 638 days.

(21) Appl. No.: 17/168,953

(22) Filed: Feb. 5, 2021

(65) Prior Publication Data

US 2021/0185628 A1 Jun. 17, 2021

Related U.S. Application Data

(63) Continuation of application No. PCT/CN2018/099909, filed on Aug. 10, 2018.

(51) Int. Cl.
*H04W 56/00* (2009.01)
*G01S 19/05* (2010.01)
(Continued)

(52) U.S. Cl.
CPC ......... *H04W 56/0015* (2013.01); *G01S 19/05* (2013.01); *H04W 72/02* (2013.01); *H04W 72/0453* (2013.01); *H04W 92/18* (2013.01)

(58) Field of Classification Search
None
See application file for complete search history.

(56) References Cited

U.S. PATENT DOCUMENTS

| 2018/0035398 A1 | 2/2018 | Lee et al. |
| 2018/0139681 A1* | 5/2018 | Jung ............... H04W 40/22 |

(Continued)

FOREIGN PATENT DOCUMENTS

| CN | 104812089 A | 7/2015 |
| CN | 107046461 A | 8/2017 |

(Continued)

OTHER PUBLICATIONS

Itl, "Discussion on NR V2X Synchronization mechanism", 3GPP TSG-RAN WG1 Meeting #94, R1-1809475, Gothenburg, Sweden, Aug. 20-24, 2018, 4 pages.

(Continued)

*Primary Examiner* — Scott M Sciacca
(74) *Attorney, Agent, or Firm* — Duane Morris LLP

(57) ABSTRACT

A method and apparatus for synchronization in sidelink communications is disclosed. In one embodiment, a method for performing sidelink communications, includes: receiving, by a first wireless communication device, a first message from a first wireless communication node; determining, by the first wireless communication device, at least one first synchronization reference according to the first message; selecting, by the first wireless communication device, one of the at least one first synchronization reference as a second synchronization reference for receiving a sidelink communication signal; and performing the sidelink communications with the second wireless communication device according to the second synchronization reference, wherein the first message comprises configuration information for the sidelink communication.

17 Claims, 10 Drawing Sheets

(51) Int. Cl.
*H04W 72/02* (2009.01)
*H04W 72/04* (2023.01)
*H04W 72/0453* (2023.01)
*H04W 92/18* (2009.01)

(56) References Cited

U.S. PATENT DOCUMENTS

2018/0213498 A1  7/2018  Khoryaev et al.
2020/0077349 A1* 3/2020  Chae .................. H04L 5/14
2020/0267671 A1* 8/2020  Chae .................. H04L 5/001

FOREIGN PATENT DOCUMENTS

| CN | 107852685 A | 3/2018 |
| EP | 3668202 A1 | 6/2020 |
| WO | 2016105136 A1 | 6/2016 |

OTHER PUBLICATIONS

Zte, "Miscellaneous corrections on V2V", 3GPP TSG-RAN WG2 #96, R2-167914, Reno, USA, Nov. 14-18, 2016, 8 pages.
Zte, "Synchronization in sidelink CA", 3GPP TSG RAN WG1 Meeting #90, R1-1712925, Prague, Czech Republic, Aug. 21-25, 2017, 4 pages.

* cited by examiner

METHOD AND APPARATUS FOR SYNCHRONIZATION IN SIDELINK COMMUNICATIONS

TECHNICAL FIELD

This disclosure relates generally to wireless communications and, more particularly, to a method and apparatus for synchronization in sidelink communications.

BACKGROUND

Sidelink (SL) communication is a wireless radio communication directly between two or more user equipment devices (hereinafter "UE"). In this type of communication, two or more UEs that are geographically proximate to each other can directly communicate without going through an eNB in an long-term evolution (LTE) system or a gNB in New Radio, or a core network. Data transmission in sidelink communications is thus different from typical cellular network communications, in which a UE transmits data to an eNB or a gNB (i.e., uplink transmissions) or receives data from an eNB or a gNB (i.e., downlink transmissions). In sidelink communications, data is transmitted directly from a source UE to a target UE through the Unified Air Interface, e.g., PC5 interface.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

Synchronization is an essential prerequisite for all mobile networks to operate. It is fundamental to data integrity, and without it, data errors and networks outages can occur, resulting in additional operational costs. A BS relies on having access to reliable and accurate synchronization signals from a synchronization source (e.g., a core network or a satellite) in order to generate radio signals based on synchronization and maintain frame alignment for data transmission. Effective synchronization also permits seamless handover of subscriber or UE connections between adjacent BSs. Routers and switches in the transport network may therefore be required to provide synchronization to BSs in order for them to handle and transport data properly. Additionally, the mobile network evolution to LTE and future planning for 5G networks and services has generated an increasing need for the delivery of accurate synchronization to the UEs in the network. Apart from the need for these networks to provide ever increasing data rates and lower network latencies, more sophisticated synchronization schemes are needed to support new features.

Sidelink (SL) communication, a new feature introduced in LTE, is supported and typically used in communications such as Device-to-Device (D2D), or Vehicle-to-Everything (V2X) communications. SL communications include broadcasts, group communications, and direct unicast communications. Each UE in the sidelink communication may separately obtain a synchronization reference for sidelink transmission from a different synchronization source, e.g., a base station (e.g., an eNB in a LTE communication system and a gNB in NR), or a satellite, or another UE. A first UE with a first synchronization reference from a first synchronization source, for example, an eNB, can determine a first transmission timing according to a first sidelink synchronization signal and/or physical sidelink broadcast channel (SLSS/PSBCH) received from an adjacent second UE with a second synchronization reference from a second different synchronization source, for example, a gNB, and vice versa, if the first synchronization reference is aligned with the second synchronization reference, the first UE can receive a sidelink service from the second UE based on the first synchronization reference, otherwise, based on the first transmission timing. This is especially important when frames are misaligned between the synchronization references on the two UEs received from different synchronization sources. However, when a SLSS/PSBCH is not transmitted from the second UE to the first UE since the transmission condition is not satisfied, for example, when an indication parameter from an eNB, networkControlledSyncTx, is off or a RSRP (reference signal received power) is smaller than a threshold value, e.g., when the first UE is close to the corresponding eNB, the transmission timing for V2X communication of the second UE is not available for the first UE. Since the first UE cannot identify the data transmitted from the second UE without the transmission timing alignment the data transmission from the second UE. Thus, there exists a need to develop a method and apparatus for synchronization in sidelink communications.

In one embodiment, a method for performing sidelink communications, the method includes: receiving, by a first wireless communication device, a first message from a first wireless communication node; determining, by the first wireless communication device, at least one first synchronization reference according to the first message; selecting, by the first wireless communication device, one of the at least one first synchronization reference as a second synchronization reference for receiving a sidelink communication signal; and performing the sidelink communications with the second wireless communication device according to the second synchronization reference, wherein the first message comprises configuration information for the sidelink communication.

In a further embodiment, a method for performing sidelink communications, the method includes: detecting, by a first communication device, at least one first synchronization signal on at least one corresponding carrier from a first wireless communication node according to first information; determining, by the first wireless communication device, a second synchronization reference for the sidelink communications with a second wireless communication device; and performing the sidelink communications with the second wireless communication device according to the second synchronization reference, wherein the sidelink communications comprise at least one of the following: transmitting and receiving sidelink communication signals.

In another embodiments, a method for performing sidelink communications, the method includes: transmitting a first sidelink synchronization signal for the sidelink communications, by a first wireless communication device, when a first condition is satisfied; determining, by the second wireless communication device, a first synchronization reference; and performing the sidelink communications between the first wireless communication device and the second wireless communication device according to the first synchronization reference, wherein the first condition comprises at least one of the following: the first wireless communication device receives a first message from a first wireless communication node, wherein the first message further comprises at least one of the following: at least one parameter of a resource pool and at least one synchronization timing, wherein the resource pool comprises at least one resource in the time and frequency domain and the synchronization timing comprises at least one time offset value; and the first synchronization reference is determined from at least one of the following: one of at least one first synchronization signal on at least one corresponding first carrier detected from the first wireless communication node and one of at least one second synchronization signal on at least one corresponding second carrier detected from a second wireless communication node.

In another embodiment, a computing device includes at least one processor and a memory coupled to the processor, the at least one processor configured to carry out the method.

Yet, in another embodiment, a non-transitory computer-readable medium has stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
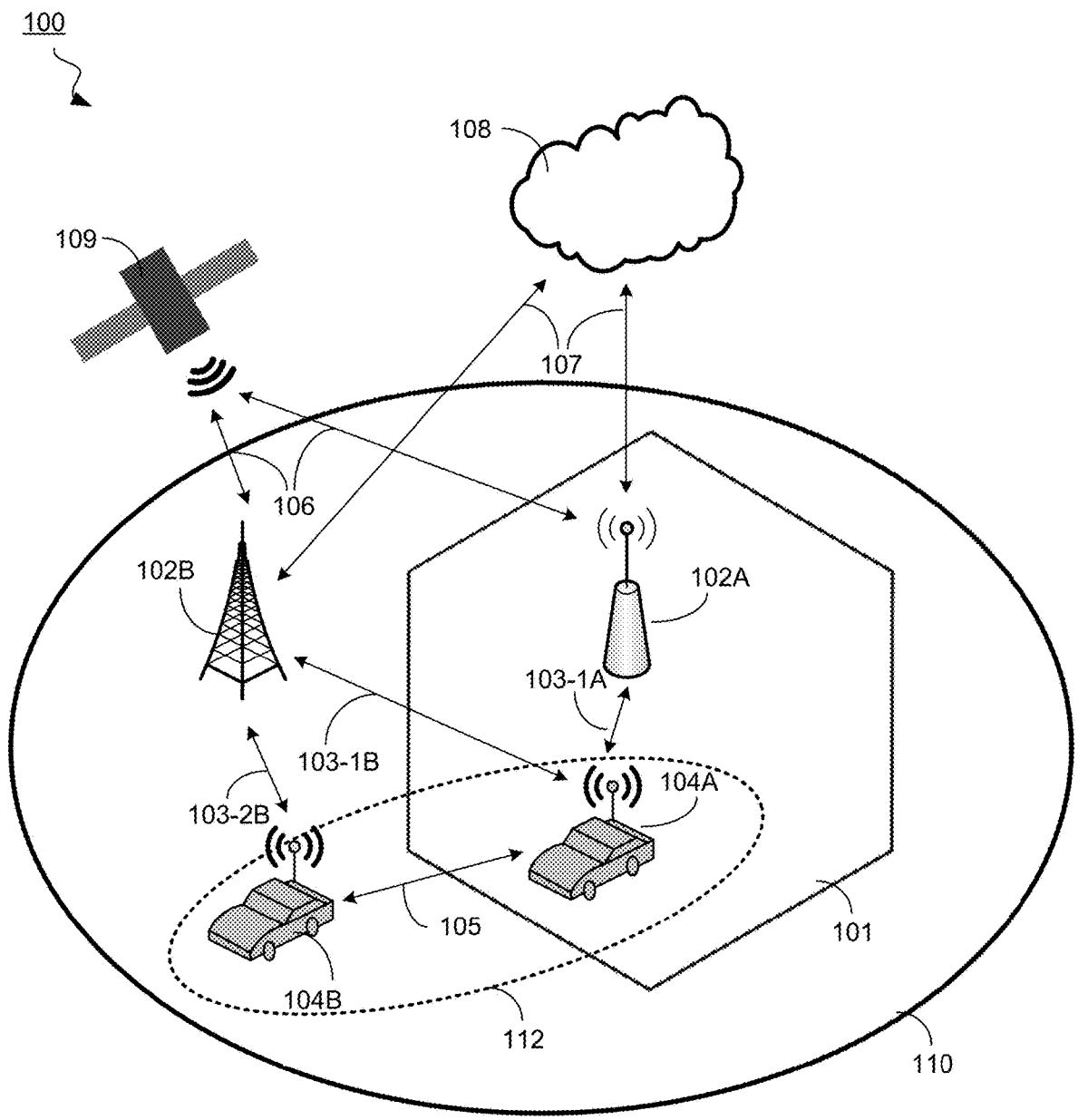
FIG. 1A illustrates an exemplary hybrid wireless communication network, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary hybrid wireless communication network 100, in accordance with some embodiments of the present disclosure. In a wireless communication system, a network side communication node or a base station (BS) can be a node B, an E-utran Node B (also known as Evolved Node B, eNodeB or eNB), a gNodeB (also known as gNB) in new radio (NR) technology, a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like, and are generally referred to as "communication devices" herein. A network and a terminal side communication node are represented by a BS 102 and a UE 104, respectively, and in all the embodiments in this disclosure hereafter, and are generally referred to as "communication nodes" herein. Such communication nodes may be capable of wireless and/or wired communications, in accordance with various embodiments of the invention. It is noted that all the embodiments are merely preferred examples, and are not intended to limit the present disclosure. Accordingly, it is understood that the system may include any desired combination of UEs and BSs, while remaining within the scope of the present disclosure.

Referring to FIG. 1A, the wireless communication network 100 includes a first BS 102A (e.g., gNB), a second BS 102B (e.g., eNB), a first UE 104A (e.g., NR-UE), and a second UE 104B (e.g., LTE-UE). The UE 104A each can be a vehicle that is moving in a first cell 101 covered by the BS 102A and a second cell 110 covered by the BS 102B. In some embodiments, the first cell 101 is in the second cell 110. In some embodiments, the UE 104A has direct communication channels 103-1A and 103-1B with the BS 102A as well as the BS 102B, respectively. Similarly, the UE 104B can be also a vehicle that is moving in the same cell 110 covered by the BS 102B, but may not have a direct communication channel with the BS 102A or is out of coverage of the cell 101. Although the UE 104b does not have a direct communication channel with the BS 102A, it forms a direct communication channel 105 with its neighbor UEs, e.g., UE 104A within a sidelink (SL) communication group 112. The direct communication channels between the UE 104 and the BS 102 can be through interfaces such as an Uu interface, which is also known as UMTS (Universal Mobile Telecommunication System (UMTS) air interface. The direct communication channels 105 between the UEs can be through a PC5 interface, which is introduced to address high moving speed and high density applications such as Vehicle-to-everything (V2X) and Vehicle-to-Vehicle (V2V) communications. The BS 102 is connected to a core network (CN) 108 through an external interface 107, e.g., an Iu interface.

The UE 104A obtains its synchronization reference from the corresponding BS 102A, which obtains its own synchronization reference from the core network 108 through an internet time service, such as a public time NTP (Network Time Protocol) server or a RNC (Radio Frequency Simulation System Network Controller) server. This is known as network-based synchronization. Alternatively, the BS 102A can also obtain synchronization reference from a Global Navigation Satellite System (GNSS) 109 through a satellite signal 106, especially for a large BS in a large cell which has a direct line of sight to the sky, which is known as satellite-based synchronization. The main advantage of the satellite-based synchronization is full independency providing a reliable synchronization signal as long as the station remains locked to a minimum number of GPS (Global Positioning System) satellites. Each GPS satellite contains multiple atomic clocks that contribute very precise time data to the GPS signals. GPS receivers on the BS 102A decode these signals, effectively synchronizing the corresponding BS 102A to the atomic clocks. This enables corresponding BS 102A to determine the time within 100 billionths of a second (i.e., 100 nanoseconds), without the cost of owning and operating atomic clocks.

Similarly, the UE 104B can obtain a synchronization reference from the corresponding BS 102B which further obtains its own synchronization reference from the core network 108 or from a GNSS 109, as discussed in detail above. The UEs 104A can also obtain a synchronization reference through the UE 104B in sidelink communications, wherein the synchronization reference of the UE 104B can be either network-based or satellite-based, as described above.

Figure 1B:
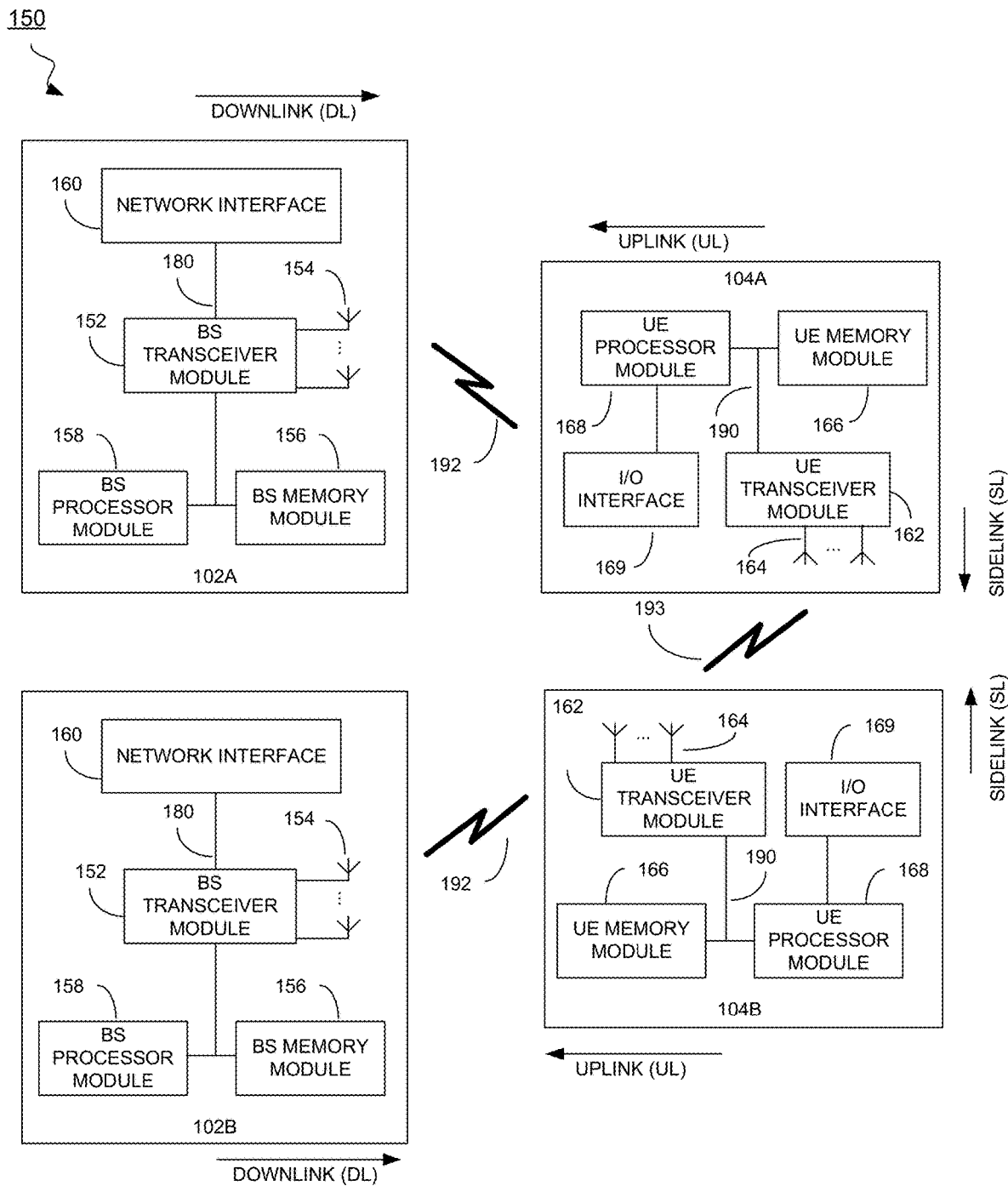
FIG. 1B illustrates a block diagram of an exemplary wireless communication system for transmitting and receiving downlink, uplink and sidelink communication signals, in accordance with some embodiments of the present disclosure.

FIG. 1B illustrates a block diagram of an exemplary wireless communication system 150 for transmitting and receiving downlink, uplink and sidelink communication signals, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a first BS 102A, a second 102B, a first UE 104A and a second UE 104B, collectively referred to as BS 102 and UE 104 below for ease of discussion. The BSs 102 each includes a BS transceiver module 152, a BS antenna array 154, a BS memory module 156, a BS processor module 158, and a network interface 160, each module being coupled and interconnected with one another as necessary via a data communication bus 180. The UE 104 includes a UE transceiver module 162, a UE antenna 164, a UE memory module 166, a UE processor module 168, and an I/O interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell (e.g., 101 for BS 102A and 110 for BS 102B) where the BS 102 is located, and in general, to operate properly within the cell. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid/heterogeneous communication network in which the UE communicates with the BS 102, and with other UEs, e.g., between 104A and 104B. As described in further detail below, the UE 104 supports sidelink communications with other UE's as well as downlink/uplink communications between the BS 102 and the UE 104. As discussed above, sidelink communication allows the UEs 104A and 104B within a sidelink communication group 112 to establish a direct communication link with each other, or with other UEs from different cells, without requiring the BS 102 to relay data between UE's.

Figure 2:
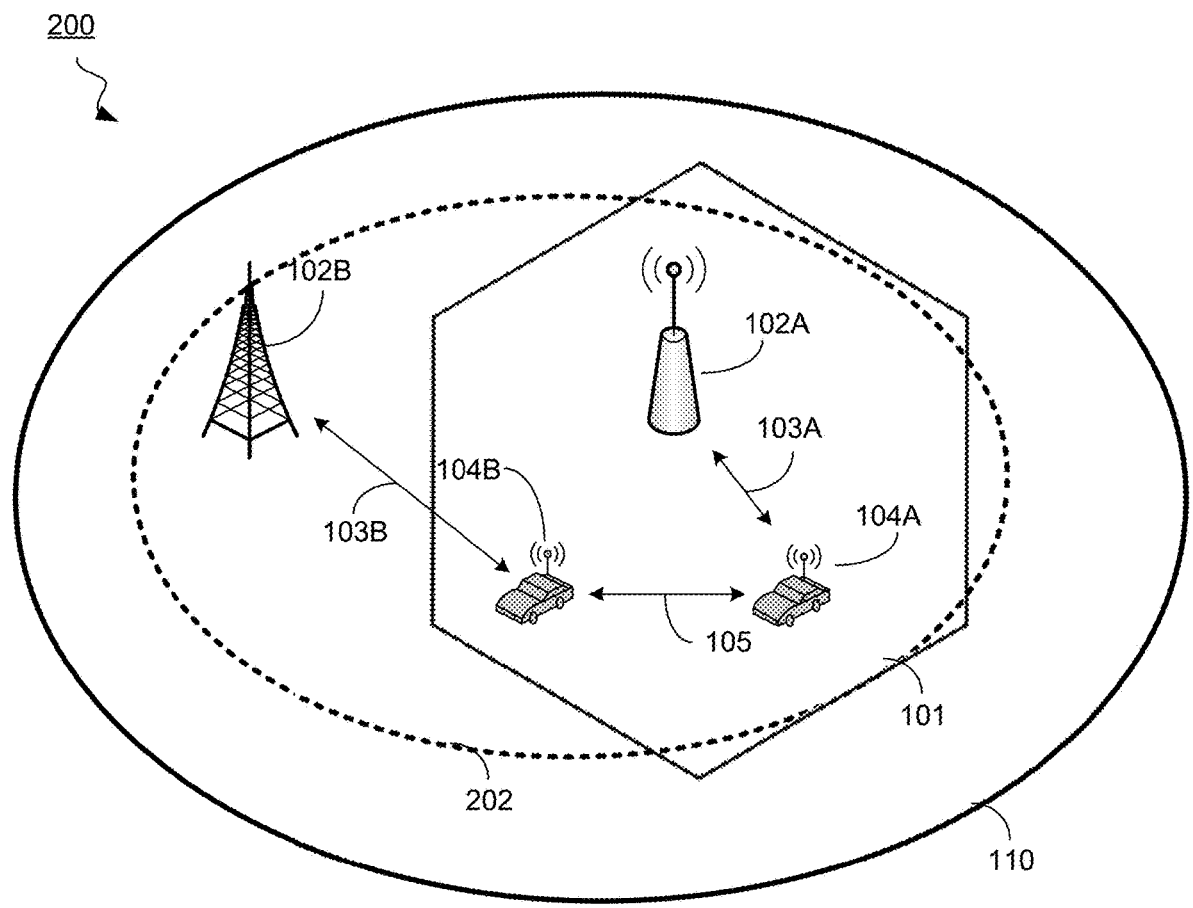
FIG. 2 illustrates an exemplary hybrid wireless communication network, in accordance with some embodiments of the present disclosure.

FIG. 2 illustrates an exemplary hybrid wireless communication network 200, in accordance with some embodiments of the present disclosure. In the illustrated embodiments, the network 200 comprises 2 BSs 102A/102B and 2 UEs 104A/104B. In the illustrated embodiments, a first BS 102A and a second BS 102B are different, for example, the first BS 102A is a gNB and the second BS 102B is an eNB. A first UE 102A and a second UE 102B are both in a first cell 101 covered by the first BS 102A. Further, the first cell 101 is also within the coverage of the second cell 110 by the second BS 102B. The first UE 104A and the second UE 104B can directly communicate with both the first BS 102A and the second BS 102B to obtain synchronization references. In some embodiments, the network 200 may comprise a plurality of heterogeneous sub-cells, for example the plurality of heterogeneous sub-cells can comprise first-level IAB (integrated access and backhaul) nodes, second level IAB nodes, etc. It is noted that the illustrated embodiment is merely an example, and are not intended to limit the present disclosure. Accordingly, it is understood that the network 200 may include any desired combination of UEs 104, and BSs 102, while remaining within the scope of the present disclosure.

In the illustrated embodiments, UE 104A is a NR-UE which can determine a first synchronization reference by detecting a first synchronization signal received from the BS 102A (e.g., gNB) and UE 104B is a LTE-UE which can determine a second synchronization reference by detecting a second synchronization signal received from the BS 102B (e.g., eNB). In some embodiments, the first synchronization reference from the first synchronization signal on the UE 104A and the second synchronization signal received from the BS 102B on the UE 104B are misaligned. Further, the UE 104B is located near a center region 202 of the LTE cell 110 and therefore, the UE 104B does not required to transmit a sidelink synchronization signal (SLSS) and physical sidelink broadcast channel (PSBCH) if it is not configured or pre-configured to transmit. The synchronization reference used for transmitting a sidelink communication signal by the UE 104B should be obtained by the UE 104A such that the UE 104A can successfully receive the sidelink communication signal transmitted from the UE 104B.

Figure 3:
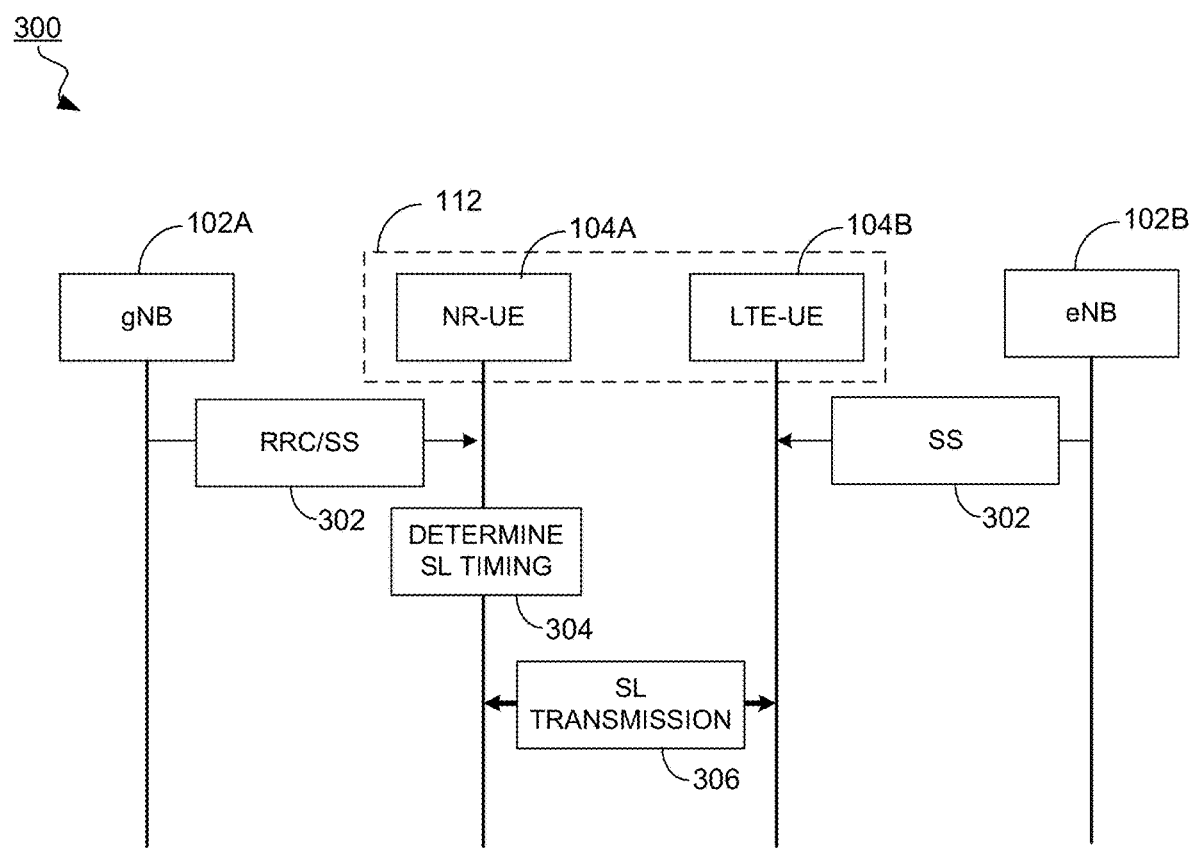
FIG. 3 illustrates a method for performing a sidelink synchronization in the exemplary hybrid wireless communication system, in accordance with some embodiments of the present disclosure.

FIG. 3 illustrates a method 300 for performing a sidelink synchronization in the exemplary hybrid wireless communication system 200, in accordance with some embodiments of the present disclosure. It is understood that additional operations may be provided before, during, and after the method 300 of FIG. 3, and that some operations may be omitted or reordered. The communication system comprises 2 BSs 102 and 2 UEs 104. It should be noted that FIG. 3 is an example and a communication system comprising any combination of BSs 102 and UEs 104 are within the scope of this disclosure.

The method 300 starts with operation 302 in which UE 104A obtains a configuration signaling for sidelink (SL) communications from the BS 102A according to some embodiments. In some embodiments, the configuration signaling comprises at least one time offset value. In some embodiments, the at least one time offset value in the configuration signaling can be used by the UE 102A to obtain at least one corresponding synchronization reference for sidelink communications. For example, there are n time offset values, i.e., offset(0), offset(1), offset(2), . . . and offset(n−1), wherein n is an positive integer and n is equal to or greater than 1. In some embodiments, the time offset value is determined by the BS 102A or pre-configured by the system.

In some embodiments, the configuration signaling received by the UE 104A from the BS 102A further comprises information of a plurality of carriers of the BS 102B and a plurality of time offset values corresponding to the plurality of carriers. In some embodiments, the configuration signaling received by the UE 104A from the BS 102A may also comprise information of a plurality of resource pools. In some embodiments, the plurality of resource pools each can be one of the following: a transmitting resource pool and a receiving resource pool. In some embodiments, the plurality of resource pools each corresponds to at least one of the plurality of time offset values and the plurality of carriers each corresponds to at least one of the plurality of time offset values. In some embodiments, a mapping relationship between the time offset value and the resource pool can be one of the following: one time offset value corresponds to one resource pool, one time offset value corresponds to multiple resource pools, and multiple time offset value corresponds to one resource pool.

In some embodiments, operation 302 also comprises determining at least one synchronization reference by detecting at least one synchronization signal from the corresponding BSs 102. For example, the UE 104A can determine a first synchronization reference by detecting a corresponding synchronization signal received from the BS 102A and the UE 104B can determine a second synchronization reference by detecting a corresponding synchronization signal received from the BS 102B. In some embodiments, the first synchronization reference determined by the UE 104A can be used as a first synchronization reference for transmitting a first SL communication signal by the UE 104A and similarly, the second synchronization reference determined by the UE 104B can be used as a second synchronization reference for transmitting a second SL communication signal by the UE 104B.

The method 300 continues with operation 304 in which the UE 104A determines at least one synchronization reference for receiving at least one SL communication signal from the UE 104B in the SL communications according to some embodiments. The synchronization reference for receiving can be determined according to the first synchronization reference by detecting the first synchronization signal received from the BS 102A and the at least one time offset value. In some embodiments, the synchronization reference for receiving in SL communications on the corresponding carriers and/or on the corresponding resource pool is equal to a summation of the first synchronization reference and the time offset value. In some embodiments, the at least one carrier is a carrier corresponding to a frequency range in the SL communications. In some other embodiments, the at least one carrier is a carrier in a serving cell of the corresponding UE 104B.

When the configuration signaling comprises a plurality of time offset values, for example, there are n time offset values, i.e., offset(0), offset(1), offset(2), . . . and offset(n−1), a plurality of synchronization reference for SL communication can be determined, i.e., the first synchronization reference+offset(0), the first synchronization reference+offset(1), the first synchronization reference+offset(2), . . . and the first synchronization reference+offset(n−1), respectively. In some embodiments, the UE 104A can receive SL communication signals in SL communications from the UE 104B on n corresponding resource pools according to the corresponding one of the n synchronization references. In some other embodiments, one of the n synchronization references can be selected as the transmitting synchronization reference and indicated by the BS 102A to the UE 102A and the n synchronization references can be used as the receiving synchronization references for receiving SL communication signals. In some other embodiments, the UE 102A can randomly select one of the n synchronization references for transmitting SL communication signals to the UE 104B.

In some embodiments, the UE 104A can obtain a first synchronization reference determined from the BS 102A and a second synchronization reference determined from the BS 102B. When the frequency ranges for a first sidelink communication, e.g., a NR-V2X signal with another NR-UE for advanced V2X business and for a second sidelink communication, e.g., an LTE-V2X signal with anther LTE-UE, the first synchronization reference is used as the synchronization reference for the first sidelink communication and the second synchronization reference is used as the synchronization reference for the second sidelink communication.

The method 300 continues with operation 306 in which the UEs 104A and 104B perform SL communications, i.e., transmitting and receiving SL communication signals, according to the determined at least one corresponding synchronization reference. In some embodiments, the UE 102A can transmit and receive SL communication signals according the determined at least one synchronization reference on the at least one corresponding carrier and/or the at least one corresponding resource pool.

Figure 4:
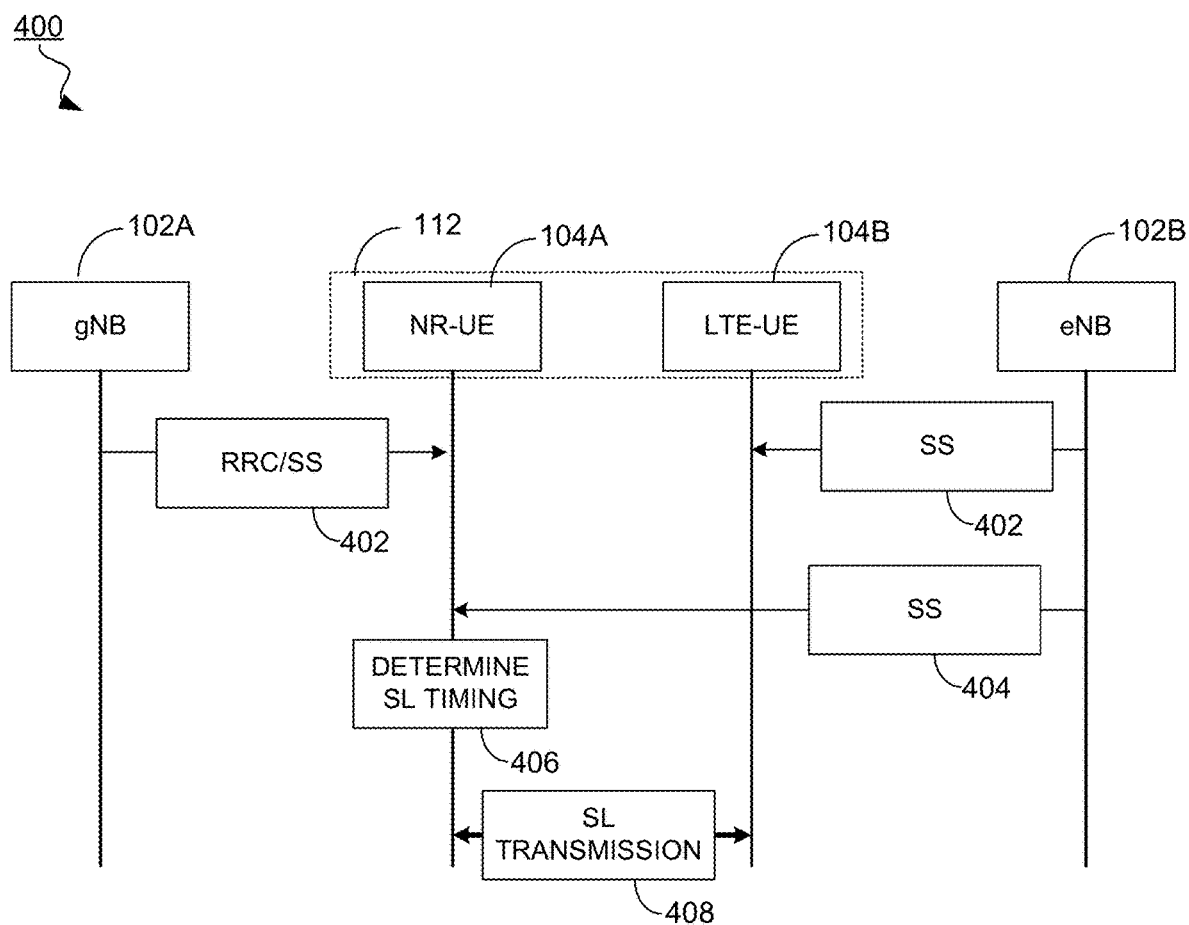
FIG. 4 illustrates a method for performing a sidelink synchronization in the exemplary hybrid wireless communication system, in accordance with some embodiments of the present disclosure.

FIG. 4 illustrates a method 400 for performing a sidelink synchronization in the exemplary hybrid wireless communication system 200, in accordance with some embodiments of the present disclosure. It is understood that additional operations may be provided before, during, and after the method 400 of FIG. 4, and that some operations may be omitted or reordered. The communication system comprises 2 BSs 102 and 2 UEs 104. It should be noted that FIG. 4 is an example and a communication system comprising any combination of BSs 102 and UEs 104 are within the scope of this disclosure.

The method 400 starts with operation 402 in which UE 104A obtains carrier information from the BS 102A according to some embodiments. In some embodiments, the carrier information can be transmitted through RRC signaling. In some embodiments, the carrier information received from the BS 102A is used to indicate information of at least one carrier on which the UE 104A can detect at least one synchronization signal to determine at least one first synchronization reference. In some embodiments, operation 402 also comprises determining at least one synchronization reference by detecting at least one synchronization signal received by the UEs 104 from the corresponding BSs 102. Specifically, the UE 104A can determine a second synchronization reference by detecting a corresponding synchronization signal received from the BS 102A and the UE 104B can determine a third synchronization reference by detecting a corresponding synchronization signal received from the BS 102B. In some embodiments, the second synchronization reference determined by the UE 104A can be used as a first synchronization reference for transmitting a first SL communication signal by the UE 104A and similarly, the third synchronization reference received by the UE 104B can be used as a second synchronization reference for transmitting a second SL communication signal by the UE 104B.

The method 400 continues with operation 404 in which the UE 104A detects the at least one synchronization signal from the BS 102B on the at least one corresponding carrier indicated by the BS 102A.

The method 400 continues with operation 406 in which the UE 104A determines at least one synchronization reference for the SL communications with the UE 104B in according to some embodiments. The at least one first synchronization reference obtained by detect the at least one synchronization signal can be then used as the at least one synchronization reference for SL communications on the at least one carrier. In some embodiments, n synchronization signals from the BS 102B are detected by the UE 104A, wherein n is a positive integer and n is equal to or greater than 1. In some embodiments, when the at least one carrier indicated by the BS 102A does not comprise a carrier on which the SL communications are performed, the UE 104A may select one of the at least one first synchronization reference of the at least one corresponding carrier from the BS 102B as the synchronization reference for SL communications. In some embodiments, the BS 102A can also select one of the at least one first synchronization reference as the synchronization reference for SL communications. In some embodiments, the first synchronization reference of the synchronization signal with the highest received power is selected as the synchronization reference for the SL communications. The at least one synchronization reference for SL communication is for one of the following: transmitting and receiving SL communication signals.

In some embodiments, the UE 104A can obtain a first synchronization reference determined from the BS 102A and a second synchronization reference determined from the BS 102B. When the frequency ranges for a first sidelink communication, e.g., an NR-V2X signal with another NR-UE for advanced V2X business and for a second sidelink communication, e.g., an LTE-V2X signal with anther LTE-UE, the first synchronization reference is used as the synchronization reference for the first sidelink communication and the second synchronization reference is used as the synchronization reference for the second sidelink communication.

The method 400 continues with operation 408 in which the UEs 104A and 104B perform SL communications, i.e., transmitting and receiving SL communication signals, according to the determined at least one corresponding synchronization reference. In some embodiments, the UE 102A can transmit and receive SL communication signals according the determined at least one synchronization reference on the at least one corresponding carrier and/or the at least one corresponding resource pool.

Figure 5:
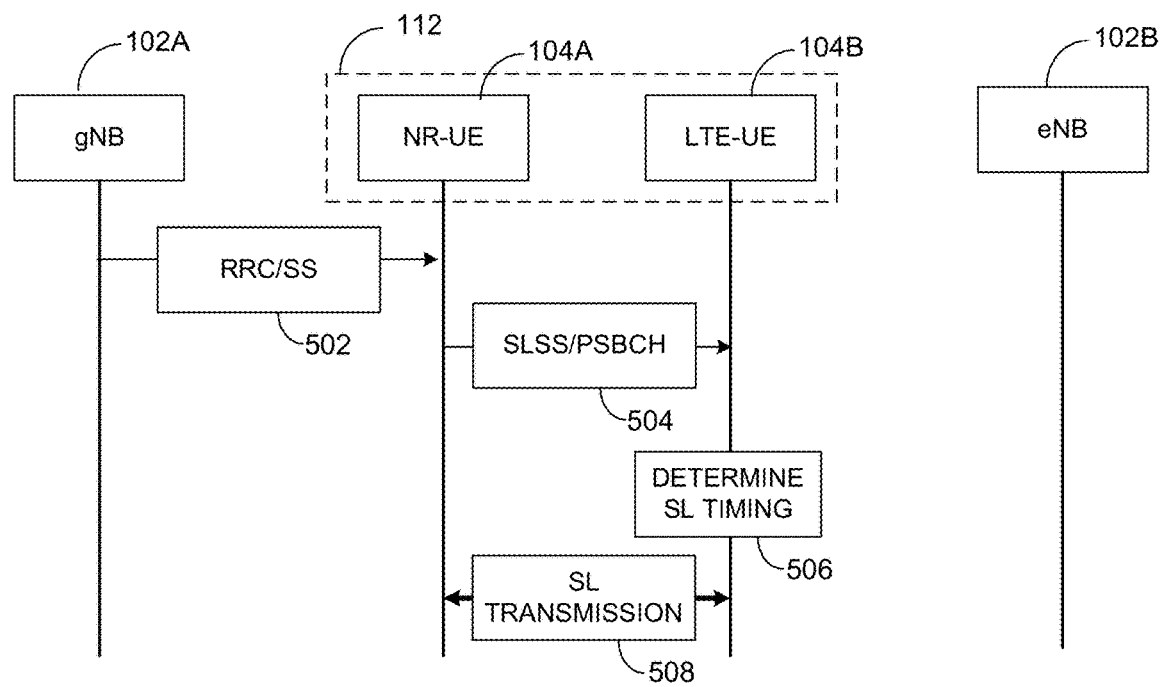
FIG. 5 illustrates a method for performing a sidelink synchronization in the exemplary hybrid wireless communication system, in accordance with some embodiments of the present disclosure.

FIG. 5 illustrates a method 500 for performing a sidelink synchronization in the exemplary hybrid wireless communication system 200, in accordance with some embodiments of the present disclosure. It is understood that additional operations may be provided before, during, and after the method 500 of FIG. 5, and that some operations may be omitted or reordered. The communication system comprises 2 BSs 102 and 2 UEs 104. It should be noted that FIG. 5 is an example and a communication system comprising any combination of BSs 102 and UEs 104 are within the scope of this disclosure. In the illustrated embodiments, the UE 104A is in a first cell 101 covered by the BS 102A and a second cell 110 covered by the BS 102B. The BS 102A and the BS 102B are gNB and eNB in an NR and LTE system, respectively. The frequency range for the sidelink communications is covered by the BS 102B and/or the BS 102A or is within a list of frequencies configured by the BS 102B and/or the BS 102A, respectively. It should be noted that the coverage configurations of the UEs 104 by the BSs 102 s can vary and are within the scope of this invention.

The method 500 starts with operation 502 in which a first message to trigger a transmission of a sidelink synchronization signal and/or physical sidelink broadcast channel (SLSS/PSBCH) by the UE 104A is transmitted from the BS 102A to the UE 104A according to some embodiments. In some embodiments, when there is SL data to be transmitted from the UE 104A, the first message can be an RRC broadcast signaling in which an indication parameter for SLSS/PSBCH transmission, networkContrlledSyncTx, is ON. In some embodiments, when the indication parameter for SLSS/PSBCH transmission, networkContrlledSyncTx, is OFF, the first message can be a synchronization signal from the BS 102A. The UE 104A can determine a synchronization reference by detecting the synchronization signal from the BS 102A, which is further used as the synchronization reference for the sidelink communications. In some embodiments, when the indication parameter for SLSS/PSBCH transmission, networkContrlledSyncTx, is OFF, the first message can be a configuration signaling, in which the BS 102A configures at least one time offset value. In some embodiments, the first message can be at least one synchronization signal from the BS 102A in which the UE 104A can determine at least one synchronization reference. In some embodiments, the first message can be at least one synchronization signal from the BS 102A in which the UE 104A can determine at least one synchronization reference which is further used for the SL communication.

In some embodiments, when the UE 104A is not covered by the BS 102B, the first message to trigger the transmission of SLSS/PSBCH by the UE 102A can be an RRC broadcast signaling in which an indication parameter for SLSS transmission, networkContrlledSyncTx, is ON. In some embodiments, when the indication parameter for SLSS transmission, networkContrlledSyncTx, is OFF or not configured, the first message can be at least one synchronization signal from the BS 102A in which the UE 104A can determine at least one synchronization reference which is further used for the SL communications.

In some embodiments, operation 502 also comprises obtaining at least one synchronization reference according to at least one synchronization signal received by the UEs 104 from the corresponding BSs 102. Specifically, the UE 104A can determine a first synchronization reference by detecting a corresponding synchronization signal received from the BS 102A and the UE 104B can determine a second synchronization reference by detecting a corresponding synchronization signal received from the BS 102B. In some embodiments, the first synchronization reference determined by the UE 104A can be used as a first synchronization reference for transmitting a first SL communication signal by the UE 104A during the SL communications and similarly, the second synchronization reference determined by the UE 104B can be used as a second synchronization reference for transmitting a second SL communication signal by the UE 104B during the SL communications.

The method 500 continues with operation 504 in which the UE 104A transmits a SLSS/PSBCH according to some embodiments. In some embodiments, the SLSS/PSBCH is transmitted according to the first synchronization reference determined by the UE 104A.

The method 500 continues with operation 506 in which a synchronization reference for the SL communications is determined by the UE 104B by detecting the SLSS/PSBCH signal from the UE 104A according to some embodiments of the present disclosure. In some embodiments, when the UE 104B initially does not have the knowledge of an exact timing of the transmission of the SL communication signal from the UE 104A, a detection of the SLSS/PSBCH signal by the UE 104B is performed continuously in the time domain until the SLSS/PSBCH signal is detected and the corresponding synchronization reference is determined by the UE 104B. In some embodiments, the detection of the SLSS/PSBCH signal can be triggered by a direct message from the BS 102B, e.g., a RRC message or a system message. In some embodiments, the synchronization reference can be further used by the UE 104B to track the UE 104A for accurate synchronization during subsequent SL communications.

In some embodiments, the UE 104A can obtain a first synchronization reference determined from the BS 102A and a second synchronization reference determined from the BS 102B. When a first frequency range for a first sidelink communication, e.g., an NR-V2X signal with another NR-UE for advanced V2X business, and a second frequency range for a second sidelink communication, e.g., an LTE-V2X signal with anther LTE-UE, the first synchronization reference is used as the synchronization reference for the first sidelink communication and the second synchronization reference is used as the synchronization reference for the second sidelink communication. In some embodiments, the first frequency range is different from the second frequency range.

The method continues with operation 508 in which the UEs 104A and 104B perform SL communications, i.e., transmitting and receiving SL communication signals, according to the determined at least one corresponding synchronization reference. In some embodiments, the UE 102A can transmit and receive SL communication signals according the determined at least one synchronization reference on at least one corresponding carrier and/or at least one corresponding resource.

In some embodiments, at least two of the methods 300, 400, 500 and 600 presented in FIGS. 3-6 can be combined to determine the at least one synchronization reference for the sidelink communication. In some embodiments, the at least two of the methods 300, 400, 500, and 600 are combined according to their priorities. For example, the priority of the methods from high to low is ordered as the following: methods 500 or 600>method 400>method 300.

Figure 6:
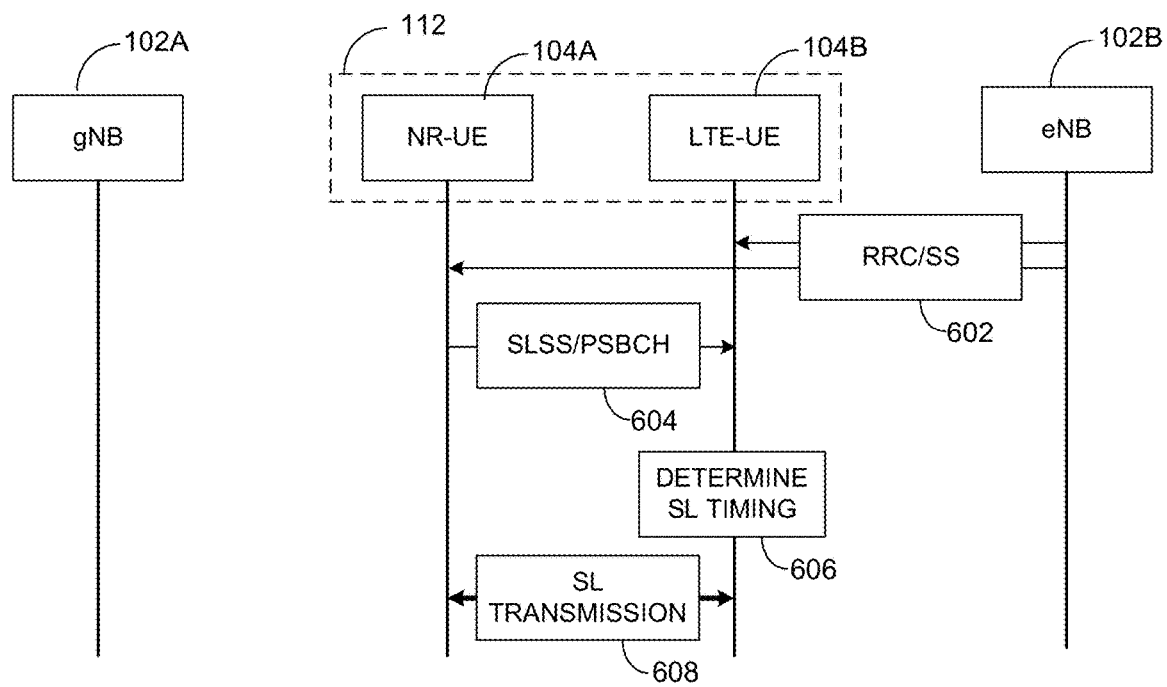
FIG. 6 illustrates a method performing a sidelink synchronization in the exemplary hybrid wireless communication system, in accordance with some embodiments of the present disclosure.

FIG. 6 illustrates a method 600 performing a sidelink synchronization in the exemplary hybrid wireless communication system 200, in accordance with some embodiments of the present disclosure. It is understood that additional operations may be provided before, during, and after the method 600 of FIG. 6, and that some operations may be omitted or reordered. The communication system comprises 2 BSs 102 and 2 UEs 104. It should be noted that FIG. 6 is an example and a communication system comprising any combination of BSs 102 and UEs 104 are within the scope of this disclosure. In the illustrated embodiments, the UE 104A is in a first cell 110 covered by the BS 102B and not in a second cell 101 covered by the BS 102A. The BS 102A and the BS 102B are gNB and eNB in an NR and LTE system, respectively. The frequency range for the sidelink communications is covered by the BS 102B or is within a list of frequencies configured by the BS 102B. It should be noted that the coverage configurations of the UEs 104 by the BSs 102 s can vary and are within the scope of this invention.

The method 600 starts with operation 602 in which a first message to trigger a transmission of a first sidelink synchronization signal and/or physical sidelink broadcast channel (SLSS/PSBCH) by the UE 104A is transmitted from the BS 102B to the UE 104A according to some embodiments. In some embodiments, when there is SL communication data to be transmitted from the UE 104A, the first message can be an RRC signaling in which an indication parameter for SLSS transmission, e.g., networkContrlledSyncTx, is ON. In some embodiments, the first message also comprises at least one synchronization signal from the BS 102B in which the UE 104A can determine at least one synchronization reference which is further used for the SL communication. In some embodiments, when the indication parameter for SLSS/PSBCH transmission, e.g., networkContrlledSyncTx, is OFF, the first message can be a synchronization signal from the BS 102B. The UE 104A can determine a synchronization reference by detecting the synchronization signal from the BS 102B, which is further used as the synchronization reference for the sidelink communications. In some embodiments, when the indication parameter for SLSS transmission, e.g., networkContrlledSyncTx, is OFF or is not configured, the first message can be at least one synchronization signal from the BS 102B in which the UE 104A can determine at least one synchronization reference.

The method 600 continues with operation 604 in which the UE 104A transmits a SLSS/PSBCH according to some embodiments. In some embodiments, the UE 104A transmits a SLSS/PSBCH according to the first synchronization reference. In some embodiments, the UE 104B can determine a SL synchronization reference by detecting the first synchronization reference for receiving the SL communication data transmitted from the UE 104A.

In some embodiments, referring back to FIG. 5, a second message to trigger a transmission of a second sidelink synchronization signal and/or physical sidelink broadcast channel (e.g., NR-based SLSS/PSBCH, hereinafter NR-SLSS and/or NR-PSBCH) by the UE 104A is transmitted from the BS 102A to the UE 104A according to some embodiments. In some embodiments, the first and the second SLSS/PSBCH are transmitted according to the corresponding synchronization references determined by the UE 104A on the corresponding synchronization signals from the BSs 102B and 102A, respectively. The synchronization references can be aligned or misaligned. In some embodiments, a first resource for transmitting the first SLSS/PSBCH and a second resource for transmitting the second SLSS/PSBCH are determined by the corresponding BSs 102A and 102B. In some other embodiments, the first and second resources for transmitting the first and second SLSS/PSBCH are pre-configured. In some embodiments, when the first and the second resources overlap in the time domain and/or when the UE 104A has limited capability to transmit the first and the second SLSS/PSBCH simultaneously, only the first SLSS/PSBCH is transmitted on the first resource or on the overlapped subframes, time slots, OFDM (orthogonal frequency division multiplexing) symbols, SC (single carrier)-OFDM symbols. In some other embodiments, when the first and the second resources overlap in the time domain and/or when the UE 104A has limited capability to transmit the first and the second SLSS/PSBCH simultaneously, the first and the second SLSS/PSBCH are transmitted alternatively on the first and the second resources.

In some other embodiments, when the first and the second resources overlap in the time domain and/or when the UE 104A has limited capability to transmit the first and the second SLSS/PSBCH simultaneously, the transmission of the first and the second SLSS/PSBCH is configured by the corresponding BSs 102 or pre-configured according to the subframe index of the first and the second resources. For example, if the subframe index mod N equals to 1, the UE 104A transmits the first SLSS/PSBCH on the first resource and if the subframe index mod N equals to 0, the UE 104A transmits the second SLSS/PSBCH on the second resource, wherein N is a positive integer.

In some embodiments, when a synchronization reference is needed for transmitting and/or receiving a SL communication signal, a UE 104A when not covered by the BS 102A can determine the synchronization reference according to the priority of the synchronization reference it can obtain. When the pre-configuration indicates a gNB has the highest priority on a frequency and when the UE 104A can determine a synchronization reference directly from the BS 102A (i.e., gNB), BS 102B (i.e., eNB), GNSS 109 and through SLSS/PSBCH from other UE which can determine its synchronization reference directly or indirectly from the corresponding BS (e.g., BS 102A and BS 102B), the priority order from high to low on the concerned frequency is listed below:

(1) a NR-SLSS/PSBCH from a UE which directly obtains a synchronization reference from the BS 102A, wherein the SLSSID of NR-SLSS is part of a set defined for a gNB in coverage and the UE is indicated in the coverage of a gNB network.

(2) a NR-SLSS/PSBCH from a UE which indirectly obtains a synchronization reference the BS 102A through a different UE, wherein the SLSSID of NR-SLSS is part of a set defined for a gNB in coverage and the UE is indicated out of the coverage of a gNB network.

(3) GNSS 109, wherein GNSS is reliable.

(4) a NR-SLSS/PSBCH from a UE which directly obtains a synchronization reference from the GNSS 109, wherein the SLSSID of NR-SLSS is a value dedicated for GNSS or NR-SLSS/PSBCH is transmitted in the resource(s) dedicated for GNSS.

(5) a NR-SLSS/PSBCH from a UE which indirectly obtains a synchronization reference from the GNSS 109 through a different UE, wherein the SLSSID of NR-SLSS is not the value dedicated for GNSS or NR-SLSS/PSBCH is not transmitted in the resource(s) dedicated for GNSS.

(6) a NR-SLSS/PSBCH from a UE which directly obtains a synchronization reference from the BS 102B, wherein the SLSSID of NR-SLSS is part of a set defined for an eNB in coverage and the UE is indicated in the coverage of an eNB network.

(7) a NR-SLSS/PSBCH of a UE which indirectly obtains a synchronization reference from the BS 102B through a different UE, wherein the SLSSID of NR-SLSS is part of a set defined for an eNB in coverage and the UE is indicated out of the coverage of an eNB network.

(8) a NR-SLSS/PSBCH of a UE which cannot obtains a synchronization reference from a BS or a GNSS or a different UE that obtains its synchronization reference directly from a BS or a GNSS. In some other embodiments, when the pre-configuration indicates gNB has the highest priority on a frequency and when the UE 104A can determine a synchronization reference directly from the BS 102A (i.e., gNB), BS 102B (i.e., eNB), GNSS 109 and through SLSS/PSBCH from other UE which can determine its synchronization reference directly or indirectly from the corresponding BS (e.g., BS 102A and BS 102B), the priority order from high to low on the concerned frequency is listed below:

(1) a NR-SLSS/PSBCH from a UE which directly obtains a synchronization reference from the BS 102A, wherein the SLSSID of NR-SLSS is part of a set defined for a gNB in coverage and the UE is indicated in the coverage of a gNB network.

(2) a NR-SLSS/PSBCH from a UE which indirectly obtains a synchronization reference the BS 102A through a different UE, wherein the SLSSID of NR-SLSS is part of a set defined for a gNB in coverage and the UE is indicated out of the coverage of a gNB network.

(3) a NR-SLSS/PSBCH from a UE which directly obtains a synchronization reference from the BS 102B, wherein the SLSSID of NR-SLSS is part of a set defined for an eNB in coverage and the UE is indicated in the coverage of an eNB network.

(4) a NR-SLSS/PSBCH of a UE which indirectly obtains a synchronization reference from the BS 102B through a different UE, wherein the SLSSID of NR-SLSS is part of a set defined for an eNB in coverage and the UE is indicated out of the coverage of an eNB network.

(5) GNSS 109, wherein GNSS is reliable.

(6) a NR-SLSS/PSBCH from a UE which directly obtains a synchronization reference from the GNSS 109, wherein the SLSSID of NR-SLSS is a value dedicated for GNSS or NR-SLSS/PSBCH is transmitted in the resource(s) dedicated for GNSS.

(7) a NR-SLSS/PSBCH from a UE which indirectly obtains a synchronization reference from the GNSS 109 through a different UE, wherein the SLSSID of NR-SLSS is not the value dedicated for GNSS or NR-SLSS/PSBCH is not transmitted in the resource(s) dedicated for GNSS.

(8) a NR-SLSS/PSBCH of a UE which cannot obtains a synchronization reference from a BS or a GNSS or a different UE that obtains its synchronization reference directly from a BS or a GNSS.

In some embodiments, when a synchronization reference is needed for transmitting and receiving a SL communication signal, a UE 104A when not covered by the BS 102A can determine the synchronization reference according to the priority of the SLSS/PSBCH it can detect. When the pre-configuration indicates GNSS has the highest priority on a frequency and when the UE 104A can determine a synchronization reference directly from the BS 102A (i.e., gNB), BS 102B (i.e., eNB), GNSS 109 and through SLSS/PSBCH from other UE which can determine its synchronization reference directly or indirectly from the corresponding BS (e.g., BS 102A and BS 102B), the priority order from high to low on the concerned frequency is listed below:

(1) GNSS 109, wherein GNSS is reliable.

(2) a NR-SLSS/PSBCH from a UE which directly obtains a synchronization reference from the GNSS 109, wherein the SLSSID of NR-SLSS is a value dedicated for GNSS or NR-SLSS/PSBCH is transmitted in the resource(s) dedicated for GNSS.

(3) a NR-SLSS/PSBCH from a UE which indirectly obtains a synchronization reference from the GNSS 109 through a different UE, wherein the SLSSID of NR-SLSS is not the value dedicated for GNSS or NR-SLSS/PSBCH is not transmitted in the resource(s) dedicated for GNSS.

(4) a NR-SLSS/PSBCH from a UE which directly obtains a synchronization reference from the BS 102A, wherein the SLSSID of NR-SLSS is part of a set defined for a gNB in coverage and the UE is indicated in the coverage of a gNB network.

(5) a NR-SLSS/PSBCH from a UE which indirectly obtains a synchronization reference the BS 102A through a different UE, wherein the SLSSID of NR-SLSS is part of a set defined for a gNB in coverage and the UE is indicated out of the coverage of a gNB network.

(6) a NR-SLSS/PSBCH from a UE which directly obtains a synchronization reference from the BS 102B, wherein the SLSSID of NR-SLSS is part of a set defined for an eNB in coverage and the UE is indicated in the coverage of an eNB network.

(7) a NR-SLSS/PSBCH of a UE which indirectly obtains a synchronization reference from the BS 102B through a different UE, wherein the SLSSID of NR-SLSS is part of a set defined for an eNB in coverage and the UE is indicated out of the coverage of an eNB network.

(8) a NR-SLSS/PSBCH of a UE which cannot obtains a synchronization reference from a BS or a GNSS or a different UE that obtains its synchronization reference directly from a BS or a GNSS.

In some other embodiments, when the pre-configuration indicates GNSS has the highest priority on a frequency and when the UE 104A can determine a synchronization reference directly from the BS 102A (i.e., gNB), BS 102B (i.e., eNB), GNSS 109 and through SLSS/PSBCH from other UE which can determine its synchronization reference directly or indirectly from the corresponding BS (e.g., BS 102A and BS 102B), the priority order from high to low on the concerned frequency is listed below:

(1) GNSS 109, wherein GNSS is reliable.

(2) a NR-SLSS/PSBCH from a UE which directly obtains a synchronization reference from the GNSS 109, wherein the SLSSID of NR-SLSS is a value dedicated for GNSS or NR-SLSS/PSBCH is transmitted in the resource(s) dedicated for GNSS; a NR-SLSS/PSBCH from a UE which directly obtains a synchronization reference from the BS 102A, wherein the SLSSID of NR-SLSS is part of a set defined for a gNB in coverage and the UE is indicated in the coverage of a gNB network; or a NR-SLSS/PSBCH from a UE which directly obtains a synchronization reference from the BS 102B, wherein the SLSSID of NR-SLSS is part of a set defined for an eNB in coverage and the UE is indicated in the coverage of an eNB network.

(3) a NR-SLSS/PSBCH from a UE which indirectly obtains a synchronization reference from the GNSS 109 through a different UE, wherein the SLSSID of NR-SLSS is not the value dedicated for GNSS or NR-SLSS/PSBCH is not transmitted in the resource(s) dedicated for GNSS; a NR-SLSS/PSBCH from a UE which indirectly obtains a synchronization reference the BS 102A through a different UE, wherein the SLSSID of NR-SLSS is part of a set defined for a gNB in coverage and the UE is indicated out of the coverage of a gNB network; or a NR-SLSS/PSBCH of a UE which indirectly obtains a synchronization reference from the BS 102B through a different UE, wherein the SLSSID of NR-SLSS is part of a set defined for an eNB in coverage and the UE is indicated out of the coverage of an eNB network.

(4) a NR-SLSS/PSBCH of a UE which cannot obtains a synchronization reference from a BS or a GNSS or a different UE that obtains its synchronization reference directly from a BS or a GNSS.

In some embodiments, the UE 104A transmits NR-SLSS/PSBCH on the second resource and detects SLSS/PSBCH on a third resource. When the second and the third resources overlap on the time domain, the NR-SLSS/PSBCH will not be transmitted on the second resource by the UE 104A. In some embodiments, when the second and the third resources overlap in the time domain, the transmission of the NR-SLSS/PSBCH is configured by the BS 102A or pre-configured. For example, the NR-SLSS/PSBCH can be transmitted at least once in a period of L in the time domain or in N sidelink synchronization resources, wherein L and N are positive integers.

The method 600 continues with operation 606 in which a synchronization reference for the SL communications is determined by detecting the SLSS/PSBCH signal from the UE 104A according to some embodiments of the present disclosure. In some embodiments, when the UE 104B initially does not have the knowledge of an exact timing of the transmission of the SLSS/PSBCH signal from the UE 104A, a detection of the SLSS and/or a PSBCH signal by the UE 104B is performed continuously in the time domain, and the SLSS/PSBCH signal is detected by the UE 104B. In some embodiments, the detection of the SLSS/PSBCH signal can be triggered by a direct message from the BS 102B, e.g., a RRC signaling or a system message. In some embodiments, the synchronization reference can be further used by the UE 104B to track the UE 104A for accurate synchronization during subsequent SL communications.

In some embodiments, the UE 104A can obtain a first synchronization reference determined from the BS 102A and a second synchronization reference determined from the BS 102B. When the frequency ranges for a first sidelink communication, e.g., an NR-V2X signal with another NR-UE for advanced V2X business and for a second sidelink communication, e.g., an LTE-V2X signal with anther LTE-UE, the first synchronization reference is used as the synchronization reference for the first sidelink communication and the second synchronization reference is used as the synchronization reference for the second sidelink communication.

The method 600 continues with operation 608 in which the UEs 104A and 104B perform SL communications, i.e., transmitting and receiving SL communication signals, according to the determined at least one corresponding synchronization reference. In some embodiments, the UE 102A can transmit and receive SL communication signals according the determined at least one synchronization reference on at least one corresponding carrier and/or at least one corresponding resource.

Figure 7:
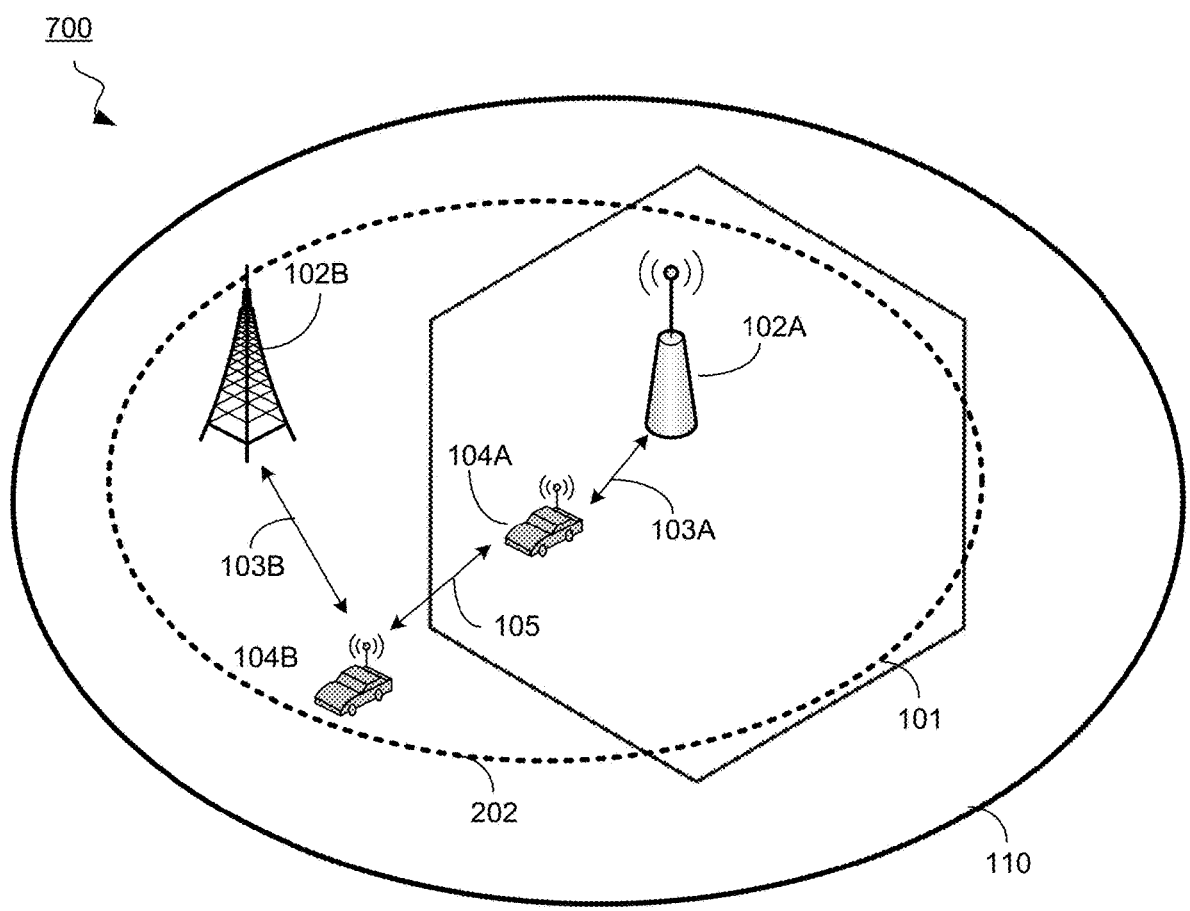
FIG. 7 illustrates an exemplary hybrid wireless communication network, in accordance with some embodiments of the present disclosure.

FIG. 7 illustrates an exemplary hybrid wireless communication network 700, in accordance with some embodiments of the present disclosure. In the illustrated embodiments, the network 700 comprises 2 BSs 102A/102B and 2 UEs 104A/104B. In the illustrated embodiments, the 2 BSs 102A/102B are different, for example, the first BS 102A is a gNB and the second BS 102B is an eNB. The first UE 102A and the second UE 102B are both in a first cell 101 covered by the first BS 102A. Further, the first cell 101 is also within the coverage of the second cell 110. The first UE 104A and the second UE 104B can directly communicate with both the first BS 102A and the second BS 102B to obtain synchronization references. In some embodiments, the network 200 may comprise a plurality of heterogeneous sub-cells, for example the plurality of heterogeneous sub-cells can comprise first-level IAB (integrated access and backhaul) nodes, second level IAB nodes, etc. It is noted that the illustrated embodiment is merely an example, and are not intended to limit the present disclosure. Accordingly, it is understood that the network 200 may include any desired combination of UEs 104, and BSs 102, while remaining within the scope of the present disclosure.

In the illustrated embodiments, UE 104A is a NR-UE which can obtain a first synchronization reference from a first synchronization signal received from the BS 102A (e.g., gNB) and UE 104B is a LTE-UE which can obtain a second synchronization reference from a second synchronization signal received from the BS 102B (e.g., eNB). In some embodiments, the first synchronization reference and the second synchronization reference are misaligned. Further, the UE 104B is also located near a center region 202 of the LTE cell 110 and therefore, the UE 104B does not required to transmit a sidelink synchronization signal (SLSS) to its neighbor UEs 104. A synchronization reference for transmitting used by the UE 104B is required such that the UE 104A can use this synchronization reference to successfully receive data transmitted from the UE 104B during sidelink communications.

Figure 8:
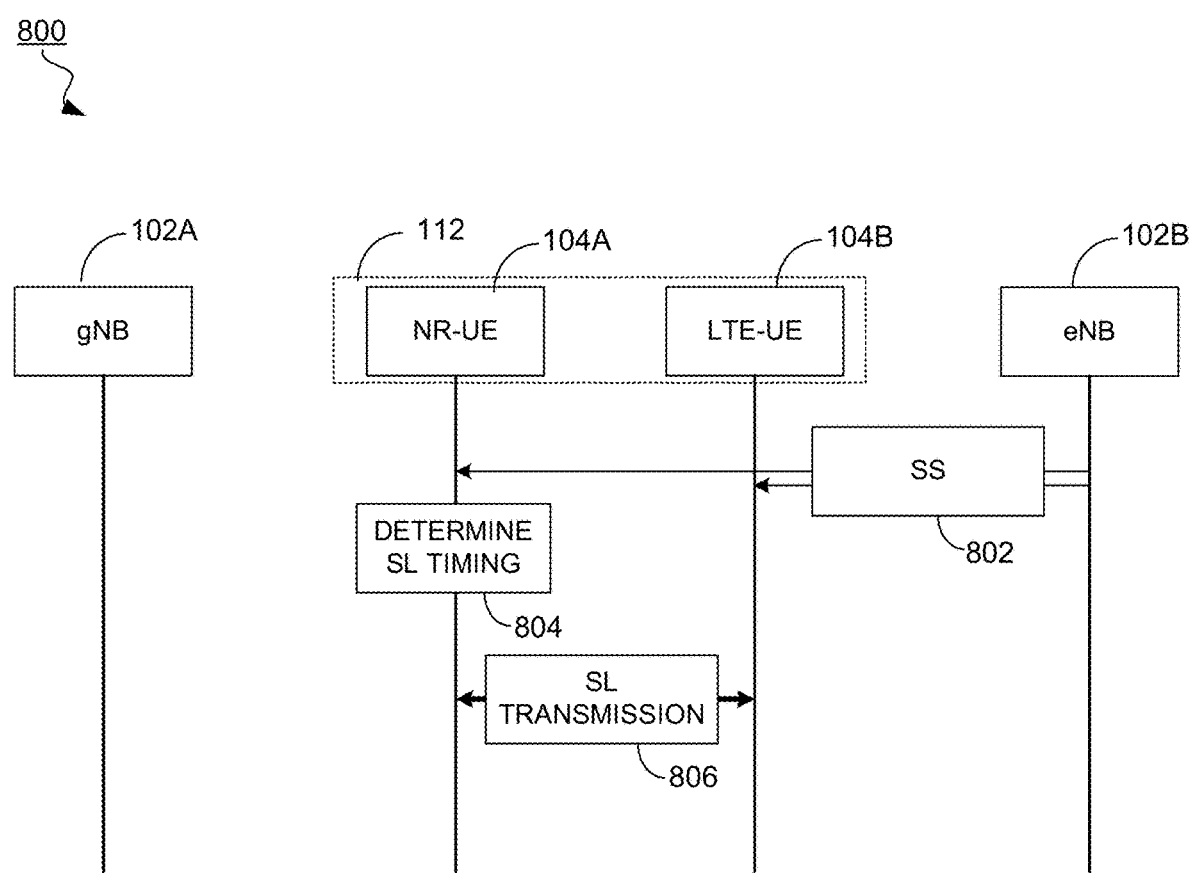
FIG. 8 illustrates a method for performing a sidelink synchronization in the exemplary hybrid wireless communication system, in accordance with some embodiments of the present disclosure.

FIG. 8 illustrates a method 800 for performing a sidelink synchronization in the exemplary hybrid wireless communication system 700, in accordance with some embodiments of the present disclosure. It is understood that additional operations may be provided before, during, and after the method 800 of FIG. 8, and that some operations may be omitted or reordered. The communication system comprises 2 BSs 102 and 2 UEs 104. It should be noted that FIG. 8 is an example and a communication system comprising any combination of BSs 102 and UEs 104 are within the scope of this disclosure.

The method 800 continues with operation 802 in which the UE 104A detects the at least one synchronization signal from the BS 102B on at least one corresponding first carrier indicated by the BS 102A according to carrier information. In some embodiments, the carrier information is pre-configured by the manufacture. The carrier information indicates information of the at least one first carrier on which the UE 104A can detect at least one synchronization signal from the BS 102B and further determine at least one first corresponding synchronization reference.

The method 800 continues with operation 804 in which the UE 104A determines the at least one synchronization reference for the SL communications with the UE 104B in according to some embodiments. In some embodiments, the at least one first synchronization reference determined by detecting the at least one synchronization signal on the at least one first carrier from the BS 102B can be then used as the at least one synchronization reference for SL communications on at least one second carrier according a mapping relationship between the first and the second carriers. In some embodiments, the mapping relationship can be configured by BS 102B or pre-configured. The at least one synchronization reference for SL communication comprises at least one of the following: a synchronization reference for transmitting and a synchronization reference for receiving SL communication signals. For example, the UE 104A detects a synchronization signal on carrier 1 and carrier 2 and determines a synchronization reference 1 and 2, respectively. When the carrier 1 and carrier 2 for detecting synchronization signals correspond to carrier 3 and 4 for SL communications according to the mapping relationship, the synchronization reference 1 from the carrier 1 is used as the synchronization reference for SL communications on the carrier 3 and the synchronization reference 2 from the carrier 2 is used as the synchronization reference for SL communication on the carrier 4 by the UE 104A.

In some other embodiments, the at least one first synchronization reference determined by detecting the at least one synchronization signal on the at least one first carrier from the BS 102B can be then used as the at least one synchronization reference for SL communications on the at least one second carrier according to corresponding system information. Specifically, the UE 104A detects the at least one synchronization signal from the BS 102B and determine the at least one first synchronization reference and by decoding the system information (i.e., SIB1 from the BS 102B to determine the at least one second synchronization reference. In some embodiments, when the SIB1 from the BS 102B comprises scheduling information of SIB21 or system information for indicating scheduling SL communications, the UE 104A uses the at least one first synchronization reference as the at least one second synchronization reference. In some embodiments, the UE 104A can combine the aforementioned methods based on the mapping relationship and system information to determine the at least one second synchronization reference for the SL communications.

The method 800 continues with operation 806 in which the UEs 104A and 104B perform SL communications, i.e., transmitting and receiving SL communication signals, according to the determined at least one corresponding synchronization reference. In some embodiments, the UE 102A can transmit and receive SL communication signals according the determined at least one synchronization reference on the at least one corresponding carrier and/or the at least one corresponding resource pool.

Figure 9:
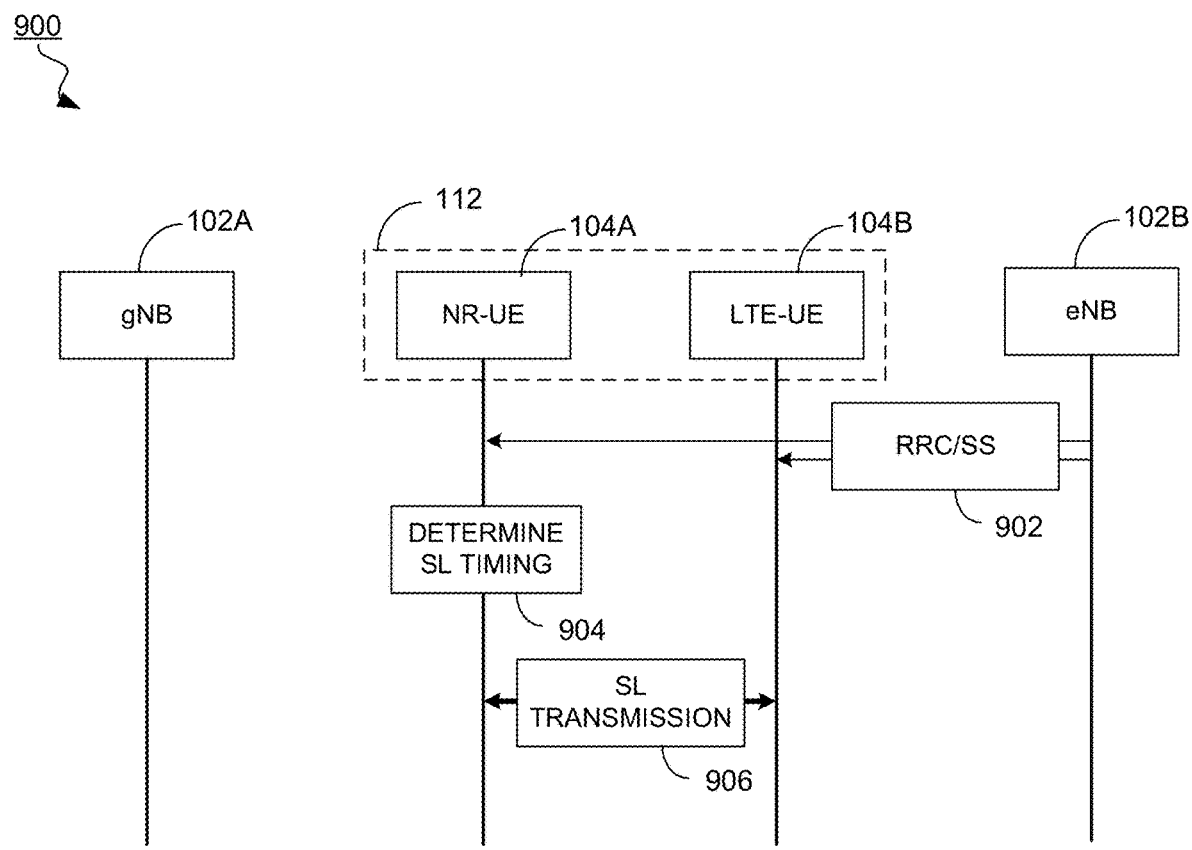
FIG. 9 illustrates a method or performing a sidelink synchronization in the exemplary hybrid wireless communication system, in accordance with some embodiments of the present disclosure.

FIG. 9 illustrates a method 900 for performing a sidelink synchronization in the exemplary hybrid wireless communication system 700, in accordance with some embodiments of the present disclosure. It is understood that additional operations may be provided before, during, and after the method 900 of FIG. 9, and that some operations may be omitted or reordered. The communication system comprises 2 BSs 102 and 2 UEs 104. It should be noted that FIG. 9 is an example and a communication system comprising any combination of BSs 102 and UEs 104 are within the scope of this disclosure.

The method 900 starts with operation 902 in which UE 104A obtains a configuration signaling for sidelink (SL) communications from the BS 102B according to some embodiments. In some embodiments, the configuration signaling is for Vehicle-to-everything (V2X) communications. In some embodiments, the configuration signaling comprises at least one time offset value. In some embodiments, the at least one time offset value in the configuration signaling can be used by the UE 102A to determine at least one corresponding synchronization reference for sidelink communications (e.g., V2X). For example, there are n time offset values, i.e., offset(0), offset(1), offset(2), . . . and offset(n−1), wherein n is an positive integer and n is equal to or greater than 1. In some embodiments, the time offset value is determined by the BS 102B or pre-configured by the system.

In some embodiments, the configuration signaling received by the UE 104A from the BS 102B further comprises information of a plurality of carriers of the BS 102B and a plurality of time offset values corresponding to the plurality of carriers. In some embodiments, the configuration signaling received by the UE 104A from the BS 102B may also comprise information of a plurality of resource pools. In some embodiments, the plurality of resource pools comprises at least one of the following: an uplink resource pool and a downlink resource pool. In some embodiments, the plurality of resource pools each corresponds to at least one of the plurality of time offset values. In some embodiments, a mapping relationship between the time offset value and the resource pool can be one of the following: 1 time offset value corresponds to 1 resource pool, 1 time offset corresponds to multiple resource pools, and multiple time offset corresponds to 1 resource pool.

The method 900 continues with operation 904 in which the UE 104A determines at least one synchronization reference for transmitting or receiving at least one SL communication signal from the UE 104B in the SL communications according to some embodiments. The synchronization reference for transmitting or receiving the at least one SL communication signal can be determined according to the first synchronization reference determined on the first synchronization signal received from the BS 102B and the at least one time offset value. In some embodiments, the synchronization reference for receiving in SL communications on the corresponding carriers and/or on the corresponding resource pool is equal to a summation of the first synchronization reference and the time offset. In some embodiments, the at least one carrier is a carrier corresponding to a frequency range in the SL communications. In some other embodiments, the at least one carrier is a carrier in a serving cell of the corresponding UE 104B.

When the synchronization timing comprises a plurality of time offset values, for example, there are n time offset values, i.e., offset(0), offset(1), offset(2), . . . and offset(n−1), a plurality of synchronization reference for SL communication can be determined, i.e., the first synchronization reference+offset(0), the first synchronization reference+offset(1), the first synchronization reference+offset(2), . . . and the first synchronization reference+offset(n−1), respectively. In some embodiments, the UE 104A can receive SL communication signals in SL communications from the UE 104B on n corresponding resource pools according to the corresponding one of the n synchronization references. In some other embodiments, one of the n synchronization references can be selected as the transmitting synchronization reference and indicated by the BS 102B to the UE 102A and the n synchronization references can be used as the receiving synchronization references for receiving SL communication signals. In some other embodiments, the UE 102A can randomly select one of the n synchronization references for transmitting SL communication signals to the UE 104B.

The method 900 continues with operation 906 in which the UEs 104A and 104B perform SL communications, i.e., transmitting and receiving SL communication signals, according to the determined at least one corresponding synchronization reference. In some embodiments, the UE 102A can transmit and receive SL communication signals according the determined at least one synchronization reference on the at least one corresponding carrier and/or the at least one corresponding resource pool.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for performing sidelink communications, comprising:
    receiving, by a first wireless communication device, a first message from a first wireless communication node;
    determining, by the first wireless communication device, at least one first synchronization reference according to the first message;
    selecting, by the first wireless communication device, one of the at least one first synchronization reference as a second synchronization reference for receiving a sidelink communication signal; and
    performing the sidelink communications with a second wireless communication device according to the second synchronization reference,
    wherein the first message comprises configuration information for the sidelink communication,
    wherein the at least one first synchronization reference is further determined by at least one third corresponding synchronization reference, wherein the at least one third corresponding synchronization reference is determined by the first wireless communication device from one of the following: at least one synchronization signal from the first wireless communication node and a Global Navigation Satellite System (GNSS) signal from at least one satellite, and
    wherein each of the at least one first synchronization reference is determined by a summation of one of the at least one third synchronization reference and one of at least one timing offset value.

2. The method of claim 1, wherein the first message comprises information of at least one synchronization timing, wherein the information of the at least one synchronization timing comprises the at least one timing offset value, wherein the at least one timing offset value each corresponds to at least one carrier.

3. The method of claim 2, wherein the at least one carrier each corresponds to a frequency range used for the sidelink communications.

4. The method of claim 1, wherein the first message further comprises at least one parameter of a resource pool, wherein the resource pool comprises at least one resource in the time and frequency domain for the sidelink communications.

5. The method of claim 4, wherein the resource pool comprises at least one of the following: a transmitting resource pool and a receiving resource pool.

6. The method of claim 4, wherein the at least one resource pool each corresponds to at least one carrier.

7. A computing device comprising at least one processor and a memory coupled to the processor, the at least one processor configured to carry out the method of claim 1.

8. A non-transitory computer readable medium having stored thereon computer executable instructions for carrying out the method of claim 1.

9. A method for performing sidelink communications, comprising:
    detecting, by a first communication device, at least one first synchronization reference on at least one corresponding carrier from a first wireless communication node according to first information;
    determining, by the first wireless communication device, a second synchronization reference for the sidelink communications with a second wireless communication device; and
    performing the sidelink communications with the second wireless communication device according to the second synchronization reference,
    wherein the sidelink communications comprise at least one of the following: transmitting and receiving sidelink communication signals,
    wherein the at least one first synchronization reference is further determined by at least one third corresponding synchronization reference, wherein the at least one third corresponding synchronization reference is determined by the first wireless communication device from one of the following: at least one synchronization signal from the first wireless communication node and a Global Navigation Satellite System (GNSS) signal from at least one satellite, and
    wherein each of the at least one first synchronization reference is determined by a summation of one of the at least one third synchronization reference and a timing offset value.

10. The method of claim 9, wherein the first information comprises information of the at least one carrier, wherein the first information is one of the following: configured by a second wireless communication node and pre-configured.

11. The method of claim 9, wherein the second synchronization reference is one of at least one first synchronization reference, wherein the at least one first synchronization reference is determined from the at least one first corresponding synchronization signal on the at least one corresponding carrier from the first wireless communication node.

12. The method of claim 11, wherein the second synchronization reference is selected from the at least one first synchronization reference according to one of the following: a maximum receiving power of the at least one first corresponding synchronization signal and a configuration indication.

13. The method of claim 9, wherein the second synchronization reference is one of at least one first synchronization reference on one of the at least one corresponding carrier for receiving a sidelink signal in the sidelink communications, when the one of the at least one carrier carries the sidelink communications.

14. A method for performing sidelink communications, comprising:
    transmitting a first sidelink synchronization signal for the sidelink communications, by a first wireless communication device, when a first condition is satisfied;
    determining, by a second wireless communication device, a first synchronization reference;
    performing the sidelink communications between the first wireless communication device and the second wireless communication device according to the first synchronization reference,
    wherein the first condition comprises at least one of the following:
        the first wireless communication device receives a first message from a first wireless communication node, wherein the first message further comprises at least one of the following: at least one parameter of a resource pool and at least one synchronization timing, wherein the resource pool comprises at least one resource in the time and frequency domain and the synchronization timing comprises at least one time offset value; and
        the first synchronization reference is determined from at least one of the following: one of at least one first synchronization signal on at least one corresponding first carrier detected from the first wireless communication node and one of at least one second synchronization signal on at least one corresponding second carrier detected from a second wireless communication node; and
    transmitting a second sidelink synchronization signal for the sidelink communications, by the first communication device, when a second condition is satisfied, wherein the first sidelink synchronization signal is different from the second sidelink synchronization signal, and if a first resource for transmitting the first sidelink synchronization signal overlaps with a second resource for transmitting the second sidelink synchronization signal in the time domain, the first communication device terminates the transmitting the first sidelink synchronization signal on the first resource.

15. The method of claim 14, wherein the first condition further comprises: the first wireless communication device receives a first signaling from the first wireless communication node for transmitting the first synchronization signal.

16. The method of claim 14, wherein the first sidelink synchronization signal comprises at least one of the following: a sidelink synchronization signal (SLSS) and a signal on a Physical Shared Broadcast Channel (PSBCH) for Long-Term Evolution (LTE) sidelink communications.

17. The method of claim 14, wherein the first and the second resources each comprises at least one of the following, a subframe, a time slot, an OFDM (orthogonal frequency division multiplexing) symbol, and a SC (single carrier)-OFDM symbol.

* * * * *